United States Patent
Zhu et al.

(10) Patent No.: US 10,585,831 B2
(45) Date of Patent: Mar. 10, 2020

(54) PCIE CONNECTORS

(71) Applicant: HEWLETT PACKARD ENTERPRISE DEVELOPMENT LP, Houston, TX (US)

(72) Inventors: Chengjun Zhu, Fremont, CA (US); William Joshua Price, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 20 days.

(21) Appl. No.: 15/418,361

(22) Filed: Jan. 27, 2017

(65) Prior Publication Data

US 2018/0217957 A1 Aug. 2, 2018

(51) Int. Cl.
*G06F 13/40* (2006.01)
*G06F 13/42* (2006.01)

(52) U.S. Cl.
CPC ...... *G06F 13/4004* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 6,393,548 B1 | 5/2002 | Kerstein et al. | |
| 6,961,347 B1 | 11/2005 | Bunton et al. | |
| 7,174,412 B2 | 2/2007 | Lin | |
| 7,660,926 B2 | 2/2010 | Schanke et al. | |
| 7,756,123 B1* | 7/2010 | Huang | G06F 13/4022 370/359 |
| 8,943,234 B1 | 1/2015 | Voorhees et al. | |
| 2013/0019033 A1* | 1/2013 | Shima | G06F 13/4059 710/34 |
| 2015/0324268 A1* | 11/2015 | Du | G06F 11/3027 714/43 |
| 2018/0011713 A1* | 1/2018 | Sun | G06F 9/4401 |

OTHER PUBLICATIONS

Teledyne Lecroy, "Understanding Lane Reversal and Polarity," Jan. 9, 2013, pp. 1-5, Available at: <teledynelecroy.com/doc/understanding-lane-reversal-and-polarity>.
Teledyne LeCroy, "PCIe® External Cable 3.0 to PCIe Slot Adapter for PCI Express® 3.0," 2016, 2 pages.

* cited by examiner

*Primary Examiner* — Henry Tsai
*Assistant Examiner* — Aurangzeb Hassan
(74) *Attorney, Agent, or Firm* — Hewlett Packard Enterprise Patent Department

(57) ABSTRACT

An example electronic device may include a peripheral component interconnect express (PCIe) connector that includes a number of lane ports that may be arranged in a row. Physical lane numbers of the lane ports in a first half of the row may be in either an ascending order or a descending order from a first end of the row toward a middle of the row. Physical lane numbers of the lane ports in a second half of the row may be in either a descending order or an ascending order from the middle of the row toward a second end of the row. The order of the second half may be ascending when the order of the first half is descending, and the order of the second half may be descending when the order of the first half is ascending.

10 Claims, 3 Drawing Sheets

PCIE CONNECTORS

BACKGROUND

Peripheral Component Interconnect Express (PCIe) is a computer bus standard that may be used for communications between various computer components/electronic devices. Various standards may incorporate portions of the PCIe standard (such as the PCIe electrical interface), including, for example, ExpressCard, SATA Express, PCI Express Mini Card, PCI Express External Cabling, etc.

A PCIe connection (link) between two devices includes a number of lanes, where each lane includes two differential signaling pairs (e.g., one for receiving data, one for sending data). Thus, each lane may include four conductive paths. The current PCIe standard specifies 1, 2, 4, 8, 12, 16, or 32 lanes per link.

DETAILED DESCRIPTION

A PCIe communications interface of an electronic device may include a PCIe connector (hereinafter "device connector") that may be electrically connected to a PCIe controller of the device. The device connector may be designed to couple with a complementary connector so as to connect electrical terminations of the device connector with electrical terminations of the complementary connector. If the complementary connector is also connected to another PCIe controller, then a PCIe link may be established between the two PCIe controllers via conductive paths passing through the device connector and the complementary connector.

In certain examples, a cable may be used to connect two PCIe device connectors. In particular, a cable may include connectors (hereinafter "cable connectors") that are designed to couple with the PCIe device connector of the electronic device. In particular, a PCIe connection (link) between two devices includes a number of lanes, and the device connector may include electrical terminations corresponding to each of the lanes (hereinafter "lane ports") that are to form electrical connections with complimentary electrical terminations in the cable connector when the cable connector is coupled with the device connector. One end of the cable may be coupled with the device connector of one device while the other end of the cable is coupled with the device connector of the other device, thereby enabling a PCIe link to be established between the devices.

In certain examples, it may be possible for multiple cables to be connected to a single device connector at the same time (i.e., multiple cables may be used for a single PCIe link). In particular, a first cable may be connected to a first half of the lane ports in the device connector while a second cable is connected to a second half of the lane ports in the device connector. See, for example, FIG. 3, in which the cables 50A and 50B are connected to the device connectors 110_1 and 110_2. For example, two four-lane (×4) cables may be connected to an eight-lane (×8) device connector. This may be desirable in certain circumstances because cables with fewer lanes may be, for example, cheaper than and/or easier to use (e.g., more flexible) than cables with more lanes.

Figure 1:
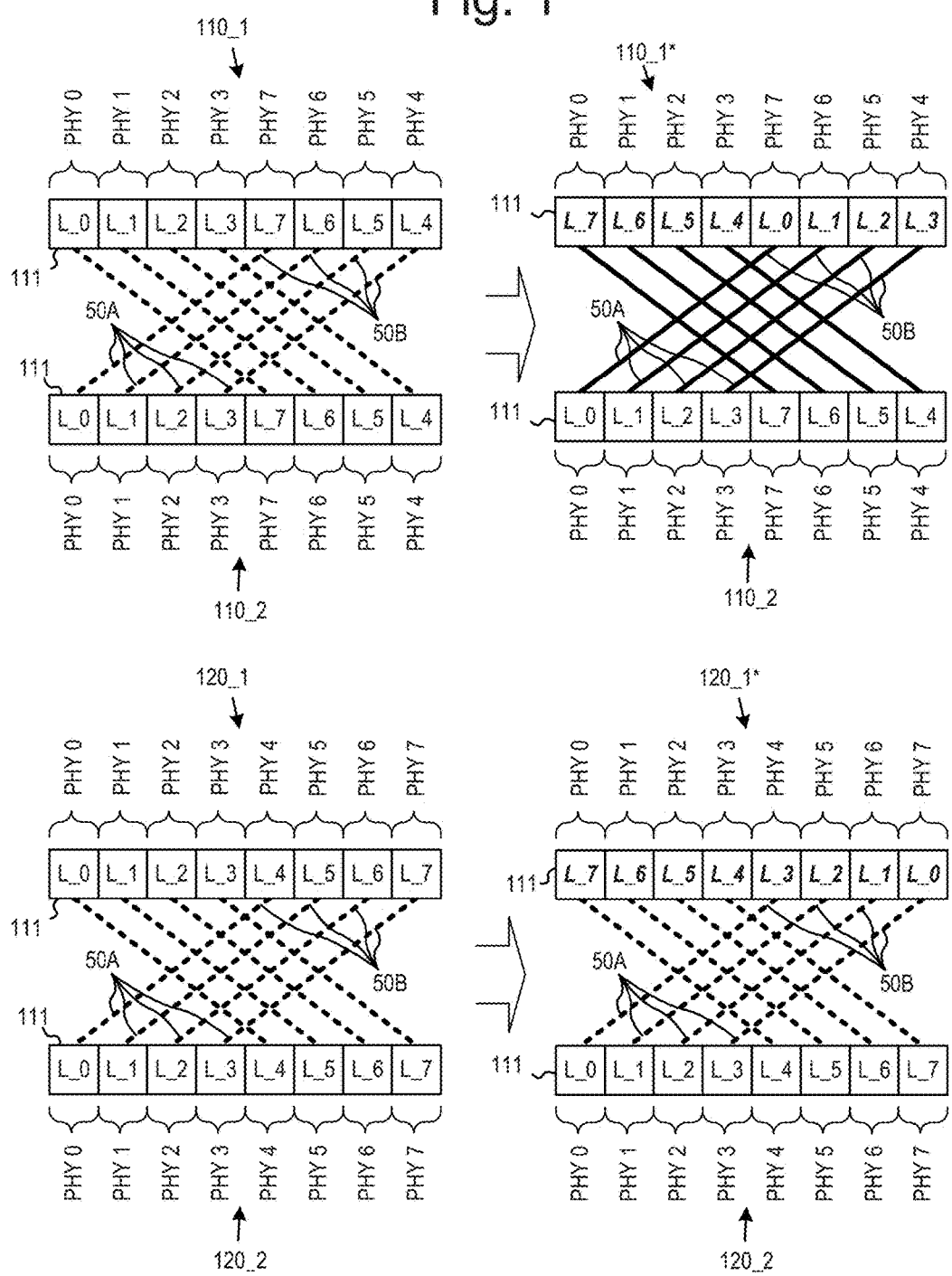
FIG. 1 illustrates example device connectors that are connected by cables in a swapped configuration prior to and after a lane reversal operation.

However, in examples in which multiple cables are used for a single PCIe link, it is possible that the cable that is connected to the first half of the lane ports at a first electronic is connected to the second half of the lane ports at a second electronic device (and vice-versa for the other cable). Thus, in such a configuration, for both cables, the physical lane numbers of the lane ports connected to one end of the cable may be different than the physical lane numbers of the lane ports connected to the other end of the same cable. Such a configuration in which the physical lane numbers of the lane ports connected to one end of the cable do not match the physical lane numbers of the lane ports connected to the other end of the same cable may be referred to hereinafter as a "swapped" configuration. For example, FIG. 1 illustrates example ×8 device connectors 110_1 and 110_2 that are connected together by ×4 cables 50A and 50B that are in the swapped configuration. The swapped configuration may be contrasted to a "normal" configuration, in which the physical lane numbers of the lane ports connected to one end of the cable are the same as the physical lane numbers of the lane ports connected to the other end of the same cable.

In examples described herein, the device connectors may be designed such that, when multiple cables per link are used, a PCIe link may be formed and may function without degradation regardless of whether the cables are in a swapped configuration or the normal configuration. In particular, the lane ports in the device connector may be arranged such that their physical lane numbers are in one of the example orders described herein, which may allow the PCIe link to form and function without degradation even when the cables are in a swapped configuration.

Specifically, the lane ports may be arranged in a row, wherein physical lane numbers of the lane ports in a first half of the row are in either an ascending order or a descending order from a first end of the row toward a middle of the row, and physical lane numbers of the lane ports in a second half of the row are in either a descending order or an ascending order from the middle of the row toward a second end of the row, with the order of the second half being ascending if the order of the first half is descending and vice-versa. In other words, the lane ports may be arranged in a row such that: (A) physical lane numbers of the lane ports in a first half of the row are in ascending order from a first end of the row toward a middle of the row, and physical lane numbers of the lane ports in a second half of the row are in descending order from the middle of the row toward a second end of the row, or (B) physical lane numbers of the lane ports in a first half of the row are in descending order from the first end of the row toward the middle of the row, and physical lane numbers of the lane ports in the second half of the row are in ascending order from the middle of the row toward the second end of the row. For example, for an ×8 device connector, the lane ports may be arranged in one of the following orders: (0, 1, 2, 3, 7, 6, 5, 4); (3, 2, 1, 0, 4, 5, 6, 7); (7, 6, 5, 4, 0, 1, 2, 3); and (4, 5, 6, 7, 3, 2, 1, 0).

The "physical lane number" of a given lane port depends on which lane input/output nodes of the PCIe controller the given lane port is physically connected to. The lane input/output nodes of the PCIe controller that are connected to the given lane port may be referred to as the corresponding lane input/output nodes. In particular, the "physical lane number" of a given lane port is equivalent to one of: (A) a physical lane number that is assigned by the PCIe controller to the corresponding lane input/output nodes; and (B) a default logical lane number that is assigned by the PCIe controller to the corresponding lane input/output nodes.

When two devices that include one of the example PCIe device connectors described herein are connected via cables, then a PCIe link may be properly established between the two devices even when multiple cables are used in a swapped configuration. In particular, when the cables are in the swapped configuration, the PCIe controller of one of the devices may detect that logical lane numbers of the lane ports on either side of the link do not match, and in response may execute a lane reversal operation (note that the logical lane numbers may be initially equal to the physical lane numbers as a default). The lane reversal operation changes a logical lane number of each lane port to its complimentary logical lane number (defined below). When one of the example lane port arrangements described herein is used, such a lane reversal operation results in the logical lane numbers in a first half of the first device connector matching the logical lane numbers in a second half of the second device connector (and vice-versa). Thus, after the lane reversal the logical lane numbers match at each end of the cable, despite being in the swapped configuration. Because the logical lane numbers on both ends of each cable match, the PCIe link may be formed normally.

For example, FIG. 1 illustrates an example in which ×8 device connectors 110_1 and 110_2 use one of the example lane arrangements described herein, with physical lane numbers being arranged in the order (0, 1, 2, 3, 7, 6, 5, 4). In FIG. 1, physical lane numbers are indicated by the notation PHY (e.g., PHY 0, PHY 1, etc.), and logical lane numbers are indicated by the notation L_(e.g., L_0, L_1, etc.). In FIG. 1, the device connectors 110_1 and 110_2 are connected together by cables 50A and 50B in swapped configuration. A left side of FIG. 1 shows a state prior to lane reversal, while a right side of FIG. 1 shows a state after the lane reversal operation is performed. As illustrated on the left side of FIG. 1, prior to lane reversal each lane port 111 of the connector 110_1 is connected to a lane port 111 of the connector 110_2 that has a different logical lane number (such connections being indicated by dashed lines in the figure). Upon detecting this, a lane reversal operation may be performed for one of the device connectors 110_1 and 110_2. FIG. 1 illustrates an example in which the lane reversal operation was been performed for the connector 110_1, which is designated as 110_1* to indicate the lane reversal. As a result of the lane reversal operation, each lane port 111 of the connector 110_1* is now connected to a lane port 111 of the connector 110_2 that has the same logical lane number (such connections being indicated by solid lines in FIG. 1). Because the logical lane numbers match on both sides of the cables 50A and 50B, a normal PCIe link may be established between the device connectors 110_1* and 110_2. Note that the same result would have occurred if lane reversal had been performed for the device connector 110_2 rather than on the device connector 110_1.

The ability to have a normal PCIe connection when the cables are in either the normal configuration or the swapped configuration may be beneficial in various circumstances. For example, if the swapped configuration cannot be used, then extra care may need to be taken to ensure that the cables are not misconnected during system installation, which can complicate the installation, increase the time required for installation, and/or increase the costs associated with installation. On the other hand, when both the normal configuration and the swapped configurations may be used, the person installing the cables does not need to worry about how the cables are installed, and thus the installation may be less complicated and proceed more quickly.

In contrast, in examples in which the lane ports of the device connectors are arranged in ascending (or descending) order from one end of the row to the other end (hereinafter, a "linear arrangement"), a swapped configuration may degrade the performance of the PCIe link or may prevent a PCIe link from being formed at all. In particular, when the cables are in the swapped configuration, the PCIe controller of one of the devices may detect that logical lane numbers of the lane ports on either side of the link do not match, and in response may execute a lane reversal operation (just as with the examples described above). However, unlike when the example lane port arrangements described herein are used, when a linear arrangement is used the lane reversal operation does not result in the logical lane numbers at both ends of each cable matching. Because the logical lane numbers do not match, a normal PCIe connection cannot be established (i.e., either no connection is established, or a connection with degraded performance is established).

For example, FIG. 1 illustrates an example in which ×8 device connectors 120_1 and 120_2 use a linear arrangement, with physical lane numbers being arranged in the order (0, 1, 2, 3, 4, 5, 6, 7). In FIG. 1, the device connectors 120_1 and 120_2 are connected together by cables 50A and 50B in swapped configuration. As noted above, a left side of FIG. 1 shows a state prior to lane reversal, while a right side of FIG. 1 shows a state after the lane reversal operation is performed. As illustrated in FIG. 1, prior to lane reversal each lane port 111 of the connector 120_1 is connected to a lane port 111 of the connector 120_2 that has a different logical lane number. Upon detecting this, a lane reversal operation may be performed for one of the connectors 120_1 and 120_2. FIG. 1 illustrates an example in which the lane reversal was performed for the connector 120_1, which is designated as 120_1* to indicate the lane reversal. However, even after the lane reversal, each lane port 111 of the connector 120_1* is still connected to a lane port 111 of the connector 120_2 that has a different logical lane number. Thus, a normal PCIe link cannot be established. Note that the same result would have occurred if lane reversal had been performed for the device connector 120_2 rather than on the device connector 120_1.

[Example Electronic Device]

Figure 2:
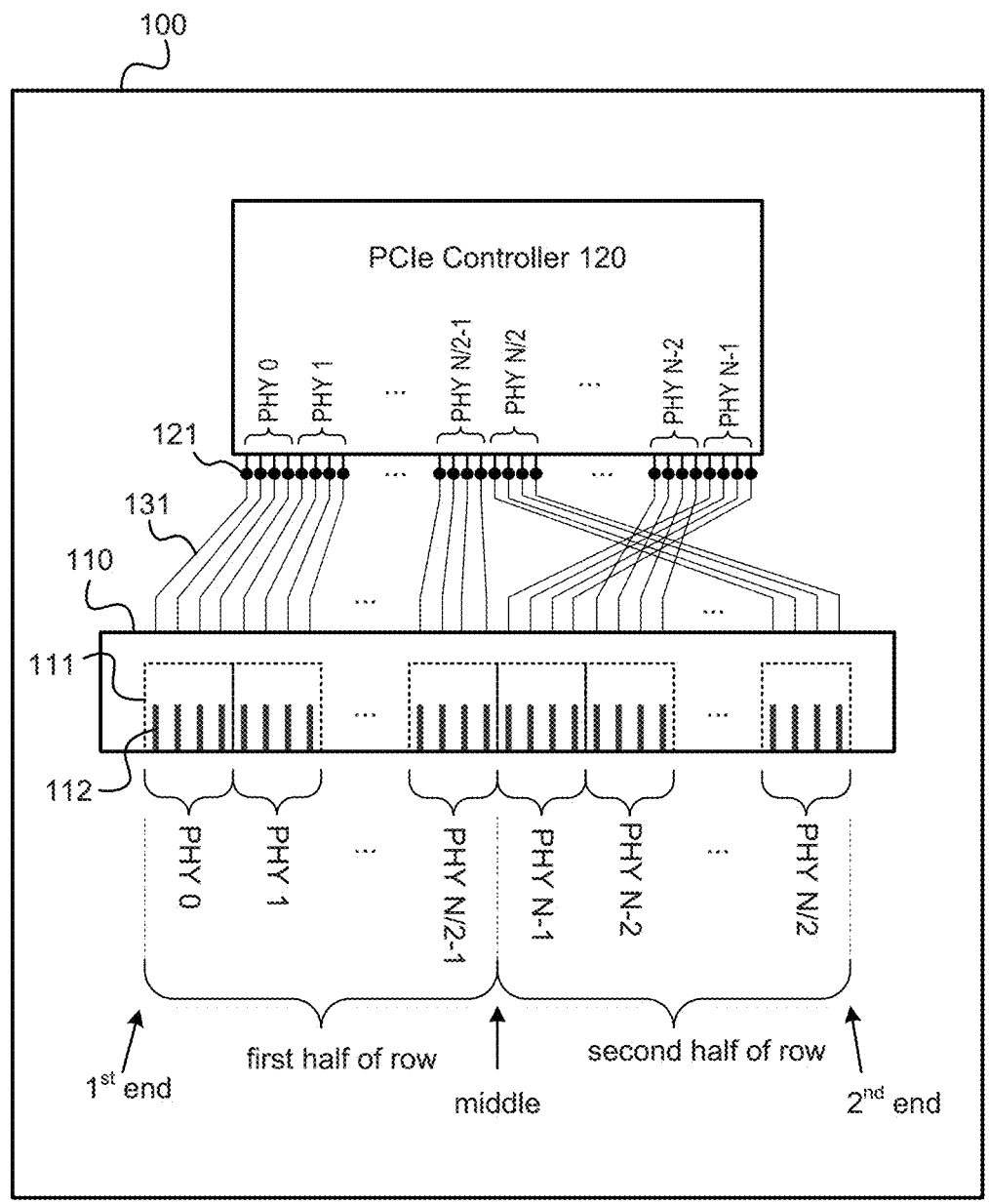
FIG. 2 illustrates an example electronic device that includes an example device connector.

FIG. 2 illustrates an example electronic device 100. The example device 100 may include a PCIe connector 110 and a PCIe controller 120.

The PCIe connector 110 may be designed to couple with a complementary connector 51 or 52 of a cable 50 (hereinafter referred to as a "cable connector") (illustrated in FIG. 3). In particular, the PCIe connector 110 may include N lane ports 111 arranged in a row, where N is an even integer greater than or equal to four. Each lane port 111 corresponds to a particular physical lane number PHY. In certain examples, N may be equal to one of 4, 8, 12, 16, and 32, each of which is a permissible number of lanes per link according to the current PCIe standard. In other examples, N may be equal to an even integer that is not specified as a permissible number of lanes per link in the current PCIe standard.

Each lane port 111 may include electrical terminations 112 (such as pins, sockets, edge connectors, etc.) that are part of the conductive paths that constitute the corresponding lane—in particular, each electrical termination 112 may be conductively connected to a corresponding input/output node 121 of the PCIe controller 120 via a conductive path 131 (e.g., a signal trace, wire, etc.). For example, each lane port 111 may include four electrical terminations 112, two corresponding to a receiving differential signaling pair of the lane and two corresponding a transmission differential signaling pair of the lane. The electrical terminations 112 of the lane ports may be designed to physically contact complimentary electrical terminations (not illustrated) of the cable connector 51/52 when the cable connector 51/52 is coupled with the device connector 111, thereby forming conductive paths between the electrical terminations 112 and the corresponding complementary electrical terminations of the cable connector 51/52.

In certain examples, the device connector 110 may be formed by multiple smaller connectors. For example, two 1×4 mini-SAS HD connectors may be used to form an ×8 device connector 110. In such examples, two ×4 mini-SAS HD cables may be used to connect to the device connector 110. As another example, four 1×4 mini-SAS HD connectors may be used to form an ×16 device connector 110. In such examples, two ×8 mini-SAS HD connectors may be used to connect to the device connector 110.

As used herein, a "PCIe connector" means any connector that is capable of implementing the PCIe electrical interface, regardless of whether or not the connector implements all aspects of the PCIe standard. In particular, as noted above, there are multiple standards that make use of the electrical interface of the PCIe standard, such as ExpressCard, SATA Express, PCI Express Mini Card, PCI Express External Cabling, etc., and thus a connector designed to implement any one of these standards may also qualify as a "PCIe connector" as the term is used herein. For example, as noted above, mini-SAS HD connectors may be an example of a PCIe connector.

In FIG. 2, an example order in which the lane ports 111 may be arranged is illustrated. In particular, in FIG. 1 the lanes are arranged in the first half of the row in ascending order from the first end of the row to the middle of the row, starting with physical lane number PHY 0 at the first end, and the lanes are arranged in the second half of the row in descending order from the middle of the row to the second end of the row, starting with physical lane number PHY N−1 at the middle. In other words, in the illustrated example the lane ports 111 are arranged in the order (0, 1, . . . N/2−1 |N−1, N−2, . . . , N/2). For example, if N=8, then this would correspond to the order (0, 1, 2, 3, 7, 6, 5, 4). As another example, if N=16, this would correspond to the order (0, 1, 2, 3, 4, 5, 6, 7, 15, 14, 13, 12, 11, 10, 9, 8).

Although FIG. 2 shows an example lane order for purposes of illustration, the connector 110 may have other example lane orderings. In particular, the lane ports 111 of the device connector 110 may be arranged in any order in which: their physical lane numbers PHY in a first half of the row are in either an ascending order or a descending order from a first end of the row toward a middle of the row, and their physical lane numbers PHY in a second half of the row are in either a descending order or an ascending order from the middle of the row toward a second end of the row, with the order of the second half being ascending if the order of the first half is descending and vice-versa. In other words, the lane ports 111 may be arranged in a row such that: (A) physical lane numbers PHY of the lane ports 111 in a first half of the row are in ascending order from a first end of the row toward a middle of the row, and physical lane numbers PHY of the lane ports 111 in a second half of the row are in descending order from the middle of the row toward a second end of the row, or (B) physical lane numbers PHY of the lane ports 111 in a first half of the row are in descending order from the first end of the row toward the middle of the row, and physical lane numbers PHY of the lane ports 111 in the second half of the row are in ascending order from the middle of the row toward the second end of the row.

For example, the lane ports may be arranged such that a lowest half of the physical lane numbers (e.g., PHY 0 through PHY N/2−1) are arranged in ascending order in the first half of the row and a highest half of the physical lane numbers (e.g., PHY N/2 through PHY N−1) are arranged in descending order in the second half of the row. As another example, the lane ports may be arranged such that a lowest half of the physical lane numbers (e.g., PHY 0 through PHY N/2−1) are arranged in descending order in the first half of the row and a highest half of the physical lane numbers (e.g., PHY N/2 through PHY N−1) are arranged in ascending order in the second half of the row. As another example, the lane ports may be arranged such that a highest half of the physical lane numbers (e.g., PHY N/2 through PHY N−1) are arranged in descending order in the first half of the row and a lowest half of the physical lane numbers (e.g., PHY 0 through PHY N/2−1) are arranged in ascending order in the second half of the row. As another example, the lane ports may be arranged such that a highest half of the physical lane numbers (e.g., PHY N/2 through PHY N−1) are arranged in ascending order in the first half of the row and the lowest half of the physical lane numbers (e.g., PHY 0 through PHY N/2−1) are arranged in descending order in the second half of the row.

In certain examples, the lane ports 111 may be arranged in a row such that respective physical lane numbers PHY of the lane ports are in one of the following orders: (0, 1, . . . N/2−1 |N−1, N−2, . . . , N/2); (N/2−1, N/2−2, . . . , 0 |N/2, N/2+1, . . . , N−1); (N−1, N−2, . . . , N/2 |0, 1, . . . N/2−1); and (N/2, N/2+1, . . . , N−1 |N/2−1, N/2−2, . . . , 0). Note that, in this context, the symbol "|" indicates a change in sequence—i.e., the symbol "|" indicates the transition point from ascending to descending or vice-versa. In other words, the lane ports 111 may be arranged in a row such that respective physical lane numbers PHY of the lane ports are in one of the following orders:

ascending from 0 through N/2−1 then descending from N−1 through N/2;

descending from N/2−1 through 0 then ascending from N/2 through N−1;

descending from N−1 through N/2 then ascending from 0 through N/2−1; and ascending from N/2 through N−1 then descending from N/2−1 through 0.

For example, for an ×8 device connector, the lane ports 111 may be arranged in one of the following orders:

(0, 1, 2, 3, 7, 6, 5, 4);
(3, 2, 1, 0, 4, 5, 6, 7);
(7, 6, 5, 4, 0, 1, 2, 3); and
(4, 5, 6, 7, 3, 2, 1, 0).

As another example, for an ×16 connector, the lane ports 111 may be arranged in one of the following orders:

(0, 1, 2, 3, 4, 5, 6, 7, 15, 14, 13, 12, 11, 10, 9, 8);
(7, 6, 5, 4, 3, 2, 1, 0, 8, 9, 10, 11, 12, 13, 14, 15);
(15, 14, 13, 12, 11, 10, 9, 8, 0, 1, 2, 3, 4, 5, 6, 7); and
(8, 9, 10, 11, 12, 13, 14, 15, 7, 6, 5, 4, 3, 2, 1, 0).

The PCIe controller 120 may be to control the establishment of a PCIe link via the connector 110. For example, the PCIe controller 120 may negotiate with another PCIe controller 120 that is connected to the connector 110 for establishment of the link. One of the two PCIe controllers 120 may determine whether the logical lane numbers of the lane ports 111 at one end of a connection match the logical lane numbers of the lane ports 111 at the other end of the connection. In response to the logical lane numbers failing to match, one of the PCIe controllers 120 may execute the lane reversal operation.

As noted above, the lane reversal operation comprises changing the logical lane number of each lane port 111 to its complimentary logical lane number. In particular, the logical lane number of a lane port 111 may initially be equal to its physical lane number as a default, i.e., the PHY 0 lane port 111 initially has logical lane number L_0, the PHY 1 lane port 111 initially has logical lane number L_1, and so on. The complimentary logical lane number of the lane port 111 that has the physical lane number PHY k is the logical lane number L_i, where i=N−1−k (assuming 0 is the lowest lane number). Thus, for example, if N=8, then complimentary logical lane number of the PHY 7 lane port 111 is logical lane number L_0, the complimentary logical lane number of the PHY 6 lane port 111 is logical lane number L_1, and so on.

The PCIe controller 120 may include a number of lane input/output nodes 121. For example, the PCIe controller 120 may include four lane input/output nodes 121 for each lane, with two serving as a differential signaling pair for transmission (lane output nodes 121) and two servicing as a differential signaling pair for reception (lane input nodes 121). The PCIe controller 120 may transmit messages along a particular lane by applying electrical signals to the corresponding lane output nodes 121 and may receive messages from a particular lane by detecting electrical signals at the corresponding lane input nodes 121. The lane input/output nodes 121 are conductively connected to the electrical terminations 112 of the lane ports 111 via conductive paths 131. For example, the conductive paths 131 may be signal traces and/or wires that may fixedly connect each of the lane input/output nodes 121 to one of the electrical terminations 112.

As noted above, the physical lane numbers PHY of the lane ports 111 depend upon which lane input/output nodes 121 of the PCIe controller 120 the lane ports 111 are connected to. Accordingly, the above-described example arrangements of the lane ports 111 may be achieved, for example, by forming conductive paths (such as signal traces, wires, etc.) so as to connect the lane ports 111 to the appropriate lane input/output nodes 121 of the PCIe controller 120. Thus, in certain examples, the desired arrangement of the lane ports 111 may be achieved without including any physical lane switching mechanisms that are to actively switch the conductive paths 131 and/or conductive paths internal to the PCIe controller 120. Such physical lane switching mechanisms may be complicated, expensive, and take up valuable space on a chip or circuit board.

More specifically, in certain examples, the conductive paths 131 between the lane input/output nodes 121 and the electrical terminations 112 may be fixed, meaning that the lane input/output nodes 121 do not change which electrical terminations 112 they are connected to during normal operation of the device 100. In other words, in such examples a physical lane switching mechanism is not included between the PCIe controller 120 and the lane ports 111 to actively switch the conductive paths 131. In addition, in certain examples, the respective physical lane numbers that are assigned by the PCIe controller 120 to the lane input/output nodes 121 are fixed, meaning that the physical lane number assigned to a given lane input/output node 121 does not change over time. Thus, complicated schemes for switching the physical lane numbers of the lane input/output nodes 121, such as a physical lane switching mechanism within the PCIe controller 120 itself, may be omitted. When both the physical lane numbers of the lane input/output nodes 121 and the conductive paths between the lane input/output nodes 121 and the electrical terminations 112 are fixed, then the physical lane numbers PHY of the lane ports 111 are also automatically fixed once the lane input/output nodes 121 are connected thereto. For example, the PCIe controller 120 may assign physical lane numbers to its input/output nodes 121, and those physical lane numbers may determine the physical lane numbers of the lane ports 111. For example, if a given lane port 111 is connected to the input/output nodes 121 that is assigned the physical lane number 1, then the given lane port 111 has a physical lane number PHY 1. As another example, the PCIe controller 120 may assign logical lane numbers to its input/output nodes 121, and the default logical lane numbers may determine the physical lane numbers of the lane ports 111. If the logical lane number assigned to an input/output node 121 later changes, this does not affect the physical lane number PHY of the lane port 111. For example, if a given lane port 111 is connected to the input/output nodes 121 whose default logical lane number is 1, then the given lane port 111 has a physical lane number PHY 1.

The PCIe controller 120 may include dedicated hardware (e.g., an Application Specific Integrated Circuit (ASIC), a Complex Programmable Logic Device (CPLD), etc.), a processor that is to execute machine readable instructions stored in a storage medium, or any combination of these. For example, any commercially available PCIe controller that has lane reversal functionality may be used as the PCIe controller 120. In particular, in certain examples, because the example arrangements of the physical lane numbers PHY of the lane ports 111 may be achieved by appropriately disposing the conductive paths 131, a commercially available PCIe controller may be used as the PCIe controller 120 without any modifications to the PCIe controller itself being needed to achieve the desired arrangement of physical lane numbers. As used herein, a "PCIe controller" means any controller that implements the electrical interface of the PCIe standard. In particular, as noted above, there are multiple standards that make use of the electrical interface of the PCIe standard, such as ExpressCard, SATA Express, PCI Express Mini Card, PCI Express External Cabling, etc., and thus in this context a "PCIe controller" may be a controller according to any such standard.

The electronic device 100 may be, for example, a PCIe communications module, which may be included in a larger device to enable the creation of PCIe links between the larger device and some other device. In such examples, the electronic device 100 may be referred to as a PCIe communications module 100. In this context, referring to the PCIe communications module 100 as a "module" means that it is a functional unit or component of a larger device, but does not necessarily imply anything about whether the PCIe communications module 100 is physically distinct from or integrated with other components or the device as a whole, or is manufactured and/or sold together with or separately from other components of the device or the device as a whole. For example, in some examples a PCIe communications module 100 may be formed on a circuit board or card (such as an expansion card) that is distinct from other components. As another example, in some examples a PCIe communications module 100 may be formed on the same circuit board or card as another component, such as on a motherboard, on a backplane, etc.

Figure 3:
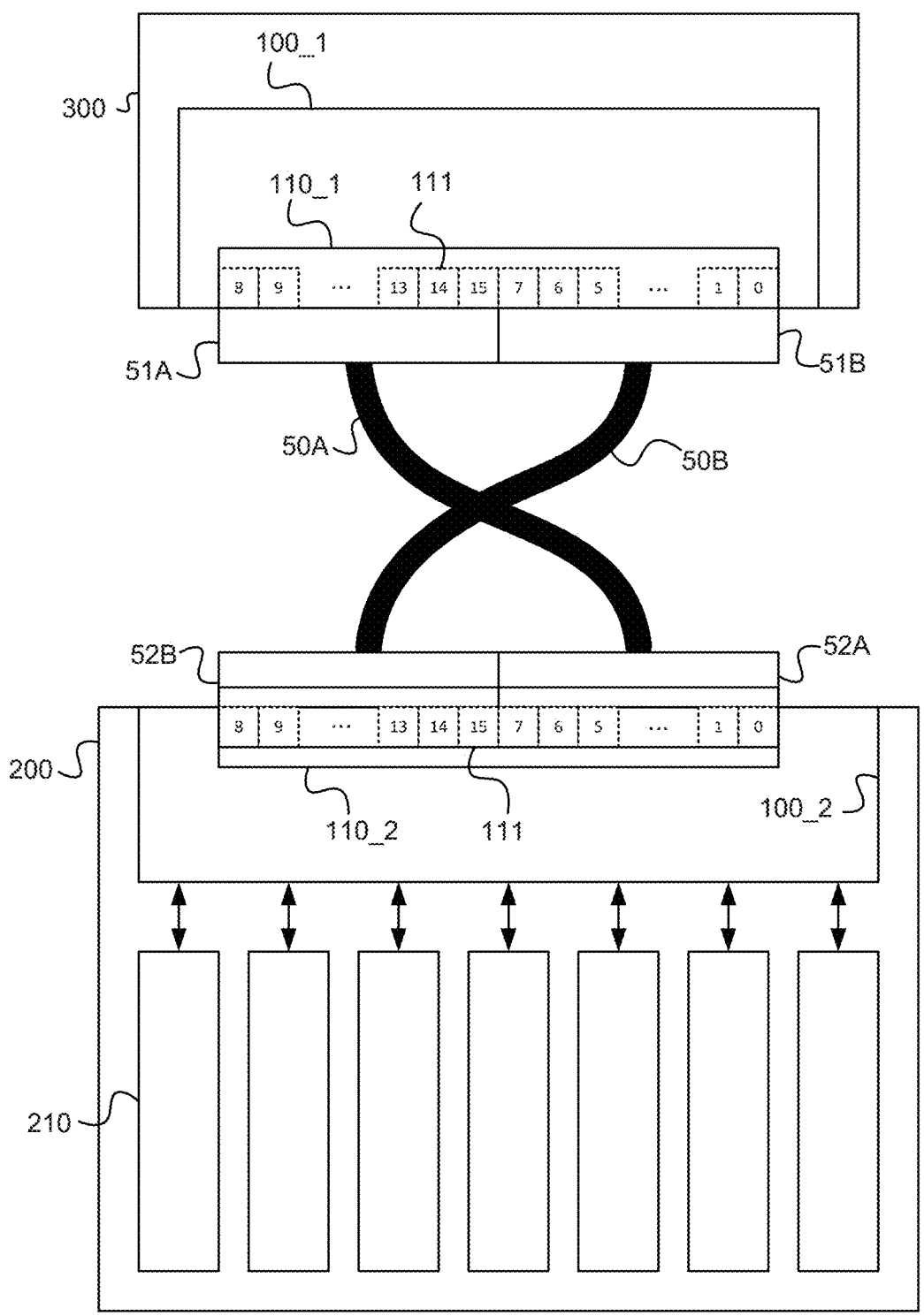
FIG. 3 illustrates an example NVMe device enclosure that includes an example PCIe communications module and an example host device that includes an example PCIe communications module.

For example, FIG. 3 illustrates one possible implementation example in which PCIe communications module 100 is included as part of a Non-Volatile Memory Express (NVMe) device enclosure 200 and/or as part of a host device 300. NVMe is a logical storage device interface specification pertaining to accessing non-volatile memory (e.g., flash memory in solid state drives) that is attached to a host device by a PCIe link. An NVMe device enclosure (occasionally referred to as a cage) may be an enclosure that includes a number of NVM storage devices and that utilizes NVMe to interface with the NVMe devices. In particular, the NVMe device enclosure 200 may include a number of NVM storage devices 210 and a number of the example PCIe communications modules 100 such as the PCIe communications module 100_2.

The PCIe communications module 100_2 may establish a PCIe link with a PCIe communications module 100_1 of an external device (such as the host device 300). For example, the connectors 110_1 and 110_2 of the PCIe communications modules 100_1 and 100_2 may be connected to one another via the cables 50A and 50B. For example, in FIG. 3 the cable connector 51A of the cable 50A is connected to a first half of the connector 110_1 and the other cable connector 52A of the cable 50A is connected to a second half of the connector 110_2, while the cable connector 51B of the cable 50B is connected to a second half of the connector 110_1 and the other cable connector 52B of the cable 50B is connected to a first half of the connector 110_2. Once so connected, PCIe communications modules 100_1 and 100_2 may negotiate to establish the PCIe link. The PCIe communications module 100_2 may also be connected to one or more of the NVM storage devices 210 and may facilitate data transfer between the host device 300 and the one or more of the NVM storage devices 210 via the PCIe link.

The PCIe communications modules 100_1 and 100_2 illustrated in FIG. 3 include example connectors 110_1 and 110_2 that are sixteen lane (×16) connectors with lane ports arranged according to one of the example physical lane order arrangements described above (the numbers shown in FIG. 3 within each lane port 111 indicate their respective physical lane numbers). However, this is merely one example, and the connectors 110_1 and 110_2 may include any number of lanes arranged according to any of the example physical lane order arrangements described herein. In FIG. 3 the cables 50A and 50B are in the swapped configuration, but this is merely an example and the cables 50A and 50B may also be connected in the normal configuration. In addition, the NVMe device enclosure 200 may include multiple PCIe communications modules 100, and each of the PCIe communications modules 100 may include multiple device connectors 110.

Although FIG. 3 illustrates the electronic device 100 being included in an NVMe device enclosure 200, it should be understood that this is merely one example of a large device in which the electronic device 100 may be included. In particular, the electronic device 100 may be included in any device for which it may be desired to establish a PCIe connection, such as in a computer, a server, a router, a switch, etc.

Throughout this disclosure and in the appended claims, occasionally reference may be made to "a number" of items. Such references to "a number" mean any integer greater than or equal to one. When "a number" is used in this way, the word describing the item(s) may be written in pluralized form for grammatical consistency, but this does not necessarily mean that multiple items are being referred to. Thus, for example, a phrase such as "a number of processors, wherein the processors . . . " could encompass both one processor and multiple processors, notwithstanding the use of the pluralized form.

The fact that the phrase "a number" may be used in referring to some items should not be interpreted to mean that omission of the phrase "a number" when referring to another item means that the item is necessarily singular or necessarily plural.

In particular, when items are referred to using the articles "a", "an", and "the" without any explicit indication of singularity or multiplicity, this should be understood to mean that there is "at least one" of the item, unless explicitly stated otherwise. When these articles are used in this way, the word describing the item(s) may be written in singular form for grammatical consistency, but this does not necessarily mean that only one items is being referred to. Thus, for example, a phrase such as "a processor, wherein the processor . . . " could encompass both one processor and multiple processors, notwithstanding the use of the singular form.

Occasionally the phrase "and/or" is used herein in conjunction with a list of items. This phrase means that any combination of items in the list—from a single item to all of the items and any permutation in between—may be included. Thus, for example, "A, B, and/or C" may include any one of: {A}, {B}, {C}, {A, B}, {A, C}, {C, B}, and {A, C, B}.

While the above disclosure has been shown and described with reference to the foregoing examples, it should be understood that other forms, details, and implementations may be made without departing from the spirit and scope of this disclosure.

What is claimed is:

1. An electronic device, comprising:
    a peripheral component interconnect express (PCIe) connector that includes a number of lane ports that are arranged in a single row,
    wherein physical lane numbers of the lane ports in a first half of the row are fixed in either an ascending order or a descending order from a first end of the row toward a middle of the row,
    physical lane numbers of the lane ports in a second half of the row are fixed in either a descending order or an ascending order from the middle of the row toward a second end of the row,
    wherein the order of the second half is ascending when the order of the first half is descending, and
    wherein the order of the second half is descending when the order of the first half is ascending;
    wherein there are eight lane ports and the respective physical lane numbers of the lane ports are in one of the following orders:
    0, 1, 2, 3, 7, 6, 5, 4;
    3, 2, 1, 0, 4, 5, 6, 7;
    7, 6, 5, 4, 0, 1, 2, 3; and
    4, 5, 6, 7, 3, 2, 1, 0.

2. A system, comprising:
    an electronic device that includes a peripheral component interconnect express (PCIe) connector that includes a number of lane ports that are arranged in a single row such that:
        physical lane numbers of the lane ports in a first half of the row are in ascending order from a first end of the row toward a middle of the row, and physical lane numbers of the lane ports in a second half of the row are in descending order from the middle of the row toward a second end of the row; or
        physical lane numbers of the lane ports in the first half of the row are in descending order from the first end of the row toward the middle of the row, and physical lane numbers of the lane ports in the second half of the row are in ascending order from the middle of the row toward the second end of the row;

wherein there are eight lane ports and the respective physical lane numbers of the lane ports are in one of the following orders:

0, 1, 2, 3, 7, 6, 5, 4;
3, 2, 1, 0, 4, 5, 6, 7;
7, 6, 5, 4, 0, 1, 2, 3; and
4, 5, 6, 7, 3, 2, 1, 0.

3. The system of claim 2,
wherein the electronic device is a communication module of an NVM Express™ (NVMe ™) device enclosure.

4. The system of claim 3, further comprising:
a host device that includes a second PCIe connector that includes a number of second lane ports that are arranged in a second row such that an order of physical lane numbers of the second PCIe connector is the same as the order of physical lane numbers of the PCIe connector,
wherein the host device is connected to the NVMe™ device enclosure via two cables connected between the PCIe connector and the second PCIe connector.

5. The system of claim 4,
wherein one of the cables is connected to lane ports in the first half of the row of the PCIe connector and to lane ports in the second half of the second row of the second PCIe connector.

6. The system of claim 2, further comprising:
a PCIe controller that has a number of lane input/output nodes that the PCIe controller assigns physical lane numbers; and
conductive paths respectively connecting the lane input/output nodes to the lane ports, wherein the physical lane number of each of the lane ports is dependent on the physical lane number of the lane input/output nodes that are connected thereto.

7. The system of claim 2,
a PCIe controller that has a number of lane input/output nodes that the PCIe controller assigns default logical lane numbers; and
conductive paths respectively connecting the lane input/output nodes to the lane ports, wherein the physical lane number of each of the lane ports is dependent on the default logical lane number of the lane input/output nodes that are connected thereto.

8. An electronic device, comprising:
a peripheral component interconnect express (PCIe) connector that includes N lane ports that are arranged in a single row, where N is an even integer, such that respective physical lane numbers of the lane ports are in one of the following orders:
ascending from 0 through N/2−1 then descending from N−1 through N/2;
descending from N/2−1 through 0 then ascending from N/2 through N−1;
descending from N−1 through N/2 then ascending from 0 through N/2−1; and
ascending from N/2 through N−1 then descending from N/2−1 through 0;
wherein N=16 and the respective physical lane numbers of the lane ports are in one of the following orders:
0, 1, 2, 3, 4, 5, 6, 7, 15, 14, 13, 12, 11, 10, 9, 8;
7, 6, 5, 4, 3, 2, 1, 0, 8, 9, 10, 11, 12, 13, 14, 15;
15, 14, 13, 12, 11, 10, 9, 8, 0, 1, 2, 3, 4, 5, 6, 7; and
8, 9, 10, 11, 12, 13, 14, 15, 7, 6, 5, 4, 3, 2, 1, 0.

9. The electronic device of claim 8,
wherein the electronic device is a communication module of an NVM Express™ (NVMe ™) device enclosure.

10. The electronic device of claim 8, further comprising:
a PCIe controller that has a number of lane input/output nodes that have respective physical lane numbers; and
conductive paths respectively connecting the lane input/output nodes to the lane ports, wherein the physical lane number of each of the lane ports is dependent on the physical lane number of the lane input/output nodes that are connected thereto.

* * * * *